US009586152B1

United States Patent
Lee

(10) Patent No.: US 9,586,152 B1
(45) Date of Patent: Mar. 7, 2017

(54) MOTION SIMULATOR WITH TWO DEGREES OF FREEDOM OF ANGULAR MOTION

(71) Applicant: MOTION DEVICE INC., Siheung-si, Gyeonggi-do (KR)

(72) Inventor: Jong Chan Lee, Anyang-si (KR)

(73) Assignee: MOTION DEVICE INC., Siheung-si (KR)

( * ) Notice: Subject to any disclaimer, the term of this patent is extended or adjusted under 35 U.S.C. 154(b) by 0 days.

(21) Appl. No.: 15/049,863

(22) Filed: Feb. 22, 2016

(30) Foreign Application Priority Data

Nov. 27, 2015 (KR) .......................... 10-2015-0167859

(51) Int. Cl.
  *A63G 31/16* (2006.01)
  *G09B 9/04* (2006.01)
  *G09B 9/08* (2006.01)

(52) U.S. Cl.
  CPC .............. *A63G 31/16* (2013.01); *G09B 9/04* (2013.01); *G09B 9/08* (2013.01)

(58) Field of Classification Search
  CPC ........ A63G 31/00; A63G 31/02; A63G 31/04; A63G 31/16; A63J 5/00; A63J 5/12; G09B 9/00; G09B 9/02

USPC .......................... 472/59–61, 130; 434/29, 55
See application file for complete search history.

(56) References Cited

U.S. PATENT DOCUMENTS 5,975,907 A * 11/1999 Advani .................. A63G 31/16
  434/29

FOREIGN PATENT DOCUMENTS

KR    10-2004-0048584 A    6/2004

* cited by examiner

*Primary Examiner* — Kien Nguyen
(74) *Attorney, Agent, or Firm* — Stein IP, LLC

(57) ABSTRACT

Provided is a motion simulator with two degrees of freedom of angular motion that is capable of performing pitching rotation and yawing rotation. The motion simulator includes: a first rotation body (100) that a user boards; a second rotation body (200) located under the first rotation body (100); a first driving unit (300) for pitching the first rotation body (100); a second driving unit (400) for yawing the first rotation body (100) and the second rotation body (200) as one body; and a controller for controlling rotation of the first driving unit (300) and rotation of the second driving unit (400).

14 Claims, 17 Drawing Sheets

MOTION SIMULATOR WITH TWO DEGREES OF FREEDOM OF ANGULAR MOTION

CROSS-REFERENCE TO RELATED APPLICATION

This application claims priority to and the benefit of Korean Patent Application No. 10-2015-0167859, filed on Nov. 27, 2015, the disclosure of which is incorporated herein by reference in its entirety.

BACKGROUND

1. Field of the Invention

The present invention relates to a motion simulator with two degrees of freedom of angular motion, and more particularly, to a motion simulator with two degrees of freedom of angular motion that is capable of performing pitching rotation and yawing rotation.

2. Discussion of Related Art

Generally, a motion simulator is a device that allows a user to feel motion of virtual reality like reality by reproducing dynamic changes to be suitable for a virtual environment controlled by a computer. The motion simulator is widely used to realize flying simulation or driving simulation. Additionally, these days, the motion simulator is used as a simulator for a game purpose or a movie theater purpose so that the user can experience three-dimensions (3D).

Korean Patent Laid-open Publication No. 10-2004-0048584 entitled "Motion simulator for virtual reality experience and method of controlling the same" is disclosed as the related art of this motion simulator.

In the motion simulator according to the related art, a first rolling member and a second rolling member can be rotated by 360 degrees in forward, backward, right, and left directions. However, a first driving unit and a second driving unit for rotating the first rolling member and the second rolling member are located at side portions of the first rolling member and the second rolling member such that it is inconvenient for the user to board the motion simulator and a structure for driving the motion simulator is complicated.

SUMMARY OF THE INVENTION

The present invention is directed to a motion simulator that is capable of implementing two degrees of freedom of angular motion of pitching rotation and yawing rotation using a simple structure.

The present invention is also directed to a motion simulator that a user can easily board.

The present invention is also directed to a motion simulator that is capable of rotating a first rotation body using a simple driving method.

The present invention is also directed to a motion simulator in which a first rotation body does not leave a predetermined rotation range.

The present invention is also directed to a motion simulator in which repair of an inside of a control module is easily performed.

The present invention is also directed to a motion simulator in which a power line and a signal line connected from an outside of a device are capable of being connected to a control module without being twisted by using a simple structure.

According to another aspect of the present invention, there is provided a motion simulator with two degrees of freedom of angular motion, including: a first rotation body (100) that a user boards; a second rotation body (200) located under the first rotation body (100); a first driving unit (300) for pitching the first rotation body (100); a second driving unit (400) for yawing the first rotation body (100) and the second rotation body (200) as one body; and a controller for controlling rotation of the first driving unit (300) and rotation of the second driving unit (400).

The first driving unit (300) can be fixed to an upper portion of the second rotation body (200) and supports a lower portion of the first rotation body (100) so that a rotational force is transferred to the first rotation body (100).

The rotational force can be transferred due to a frictional force between the first rotation body (100) and the first driving unit (300).

The first driving unit (300) may comprise: a driving module (310) comprising a first motor (311) for providing a rotational driving force, a pair of driving rollers (314-1 and 314-2) that rotate by the first motor (311) and rotate the first rotation body (100) due to the frictional force, and a driving shaft (317) that connects the pair of driving rollers (314-1 and 314-2) and rotates as one body with the pair of driving rollers (314-1 and 314-2); and a driven module (320) comprising a pair of driven rollers (324-1 and 324-2) that rotate due to the frictional force and are subordinate to the rotation of the first rotation body (100), and a driven shaft (327) that connects the pair of driven rollers (324-1 and 324-2) and rotates as one body with the pair of driven rollers (324-1 and 324-1).

The first rotation body (100) may comprise a first frame (110) and a second frame (120), which are disposed at positions corresponding to the pair of driving rollers (314-1 and 314-2), and a connection frame (130) that connects between the first frame (110) and the second frame (120), and the first frame (110) and the second frame (120) have curved shapes with uniform curvatures and respectively comprise rotation portions (111 and 121) that rotate due to a frictional force between surfaces of the driving rollers (314-1 and 314-2) and the driven rollers (324-1 and 324-2).

The rotation portions (111 and 121) may be formed of metal, and portions of the driving rollers (314-1 and 314-2) that contact the rotation portions (111 and 121) are formed of urethane.

An encoder (328) for measuring the number of revolutions of the driven roller (324-1) may be provided, and the controller compares a set number of revolutions for rotating the driving roller (314-1) by a set number of revolutions with a measured number of revolutions of the driven roller (324-1) measured by the encoder (328) and increases the number of revolutions of the first motor (311) so as to compensate for a difference between the set number of revolutions and the measured number of revolutions.

The driving module (310) may comprise first bearing housings (313-1 and 313-2) that are fixed to the upper portion of the second rotation body (200) and support the pair of driving rollers (314-1 and 314-2) to be rotatable through a medium of a first bearing (318-1), and first roller stoppers (316-1 and 316-2) that are fixed to upper sides of the first bearing housings (313-1 and 313-2) and prevent the first rotation body (100) from escaping in an upward direction, and the driven module (320) comprises second bearing housings (323-1 and 323-1) that are fixed to the upper portion of the second rotation body (200) and support the pair of driven rollers (324-1 and 324-2) to be rotatable through a medium of a second bearing, and second roller stoppers (326-1 and 326-2) that are fixed to upper sides of the second bearing housings (324-1 and 324-2) and prevent the first rotation body (100) from escaping in the upward direction.

The first rotation body (100) may comprise first stoppers (114 and 124) and second stoppers (115 and 125) for limiting a range of rotation when pitching rotation of the first rotation body (100) is performed by the first driving unit (300).

The second rotation body (200) may comprise: a second rotation body cover (210) formed to cover the upper portion and side portions of the second rotation body (200); a second rotation body support frame (220) that is provided in the second rotation body cover (210) and supports the second rotation body cover (210); a second rotation body lower frame (230) that supports a lower portion of the second rotation body support frame (220), the second driving unit (400) being mounted on one side of the second rotation body lower frame (230) and a plurality of casters (231) being mounted on a bottom surface of the second rotation body lower frame (230); and a control module (240) in which control components (241) for controlling the first driving unit (300) and the second driving unit (400) are provided, and a fixed frame (500) is provided to support a lower portion of the second rotation body (200) so that the second rotation body (200) is rotatable and has a driven portion engaged with a rotation shaft of the second driving unit (400) and mounted on the fixed frame (500).

A pair of slide rails (225) may be provided on both sides of the second rotation body support frame (220), a pair of rail guides (244) are provided on the control module (240) to be combined with the pair of slide rails (225) to be slidable, and the control module (240) is slidable between an inside and an outside of the second rotation body (200).

First cables (2-1 and 2-2) and second cables (3-1 and 3-2) may be provided outside the second rotation body (200) so as to supply power to the control module (240) and to transceive signals, and a first cable carrier (260) is provided so that one end of the first cable carrier (260) is combined with the second rotation body lower frame (220), the other end of the first cable carrier (260) is combined with the control module (240) and the first cables (2-1 and 2-2) and the second cables (3-1 and 3-2) pass through an internal space of the first cable carrier (260), and the first cable carrier (260) has a flexible shape to absorb movement displacement of the control module (240) when the control module (240) slides.

A first external cable (2-1) and a second external cable (3-1) may be provided outside the second rotation body (200) and a first internal cable (2-2) and a second internal cable (3-2) are provided in the second rotation body (200) so as to supply power to the control module (240) from an outside of the second rotation body (200) and to transceive signals, and a slip ring (530) is provided to connect the first external cable (2-1) and the first internal cable (2-2) and the second external cable (3-1) and the second internal cable (3-2), respectively, in a state in which the second rotation body (200) rotates.

A slip ring connection member (520) may be provided so that a bottom end of the slip ring connection member (520) is fixed to the fixed frame (500), the slip ring connection member (520) passes through the second rotation body lower frame (220) in a vertical direction, a bearing is interposed between the slip ring connection member (520) and the second rotation body lower frame (220), the slip ring (530) is combined with a top end of the slip ring connection member (520) and a central hole (521) is formed in the slip ring connection member (520) in the vertical direction, and the slip ring (530) may comprise: a first slip ring inner race (531), which surrounds an outside of the slip ring connection member (520), to which the first external cable (2-1) is connected, and which is fixed to the slip ring connection member (520) so that rotation of the first slip ring inner race (531) is prevented; a first slip ring outer race (532), which is provided to surround an outside of the first slip ring inner race (531) through which current flows between sides facing the first slip ring outer race (532) and the first slip ring outer race (532), to which the first inner cable (2-2) is connected, and which is rotated together with the second rotation body (200); a second slip ring outer race (533), which is inserted into a top end of the central hole (521) so that rotation of the second slip ring outer race (533) is prevented, and to which the second external cable (3-1) is connected; and a second slip ring inner race (534), which is inserted into the second slip ring outer race (533) through which current flows between sides facing the second slip ring inner race (534) and the second slip ring inner race (534), and to which the second inner cable (3-2) is connected.

A first hole (522) and a second hole (523) may be formed in the slip ring connection member (522) in a lateral direction so as to communicate with the central hole (521), and after the first external cable (2-1) and the second external cable (3-1) are inserted into the central hole (521) through the first hole (522), the first external cable (2-1) is drawn toward an outside of the slip ring connection member (520) through the second hole (523) and is connected to the first slip ring inner race (531), and the second external cable (3-1) is connected to the second slip ring outer race (533) in the central hole (521).

An angle sensor for measuring a rotation angle is provided on the first rotation body (100), and the controller compares a set rotation angle for rotating the first rotation body (100) to a set rotation angle with a measured rotation angle of the first rotation body (100) measured by the angle sensor and increases the number of revolutions of the first motor (311) so as to compensate for a difference between the set rotation angle and the measured rotation angle.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, a configuration and an operation of exemplary embodiments of the present invention will be described in detail with reference to the accompanying drawings.

Figure 1:
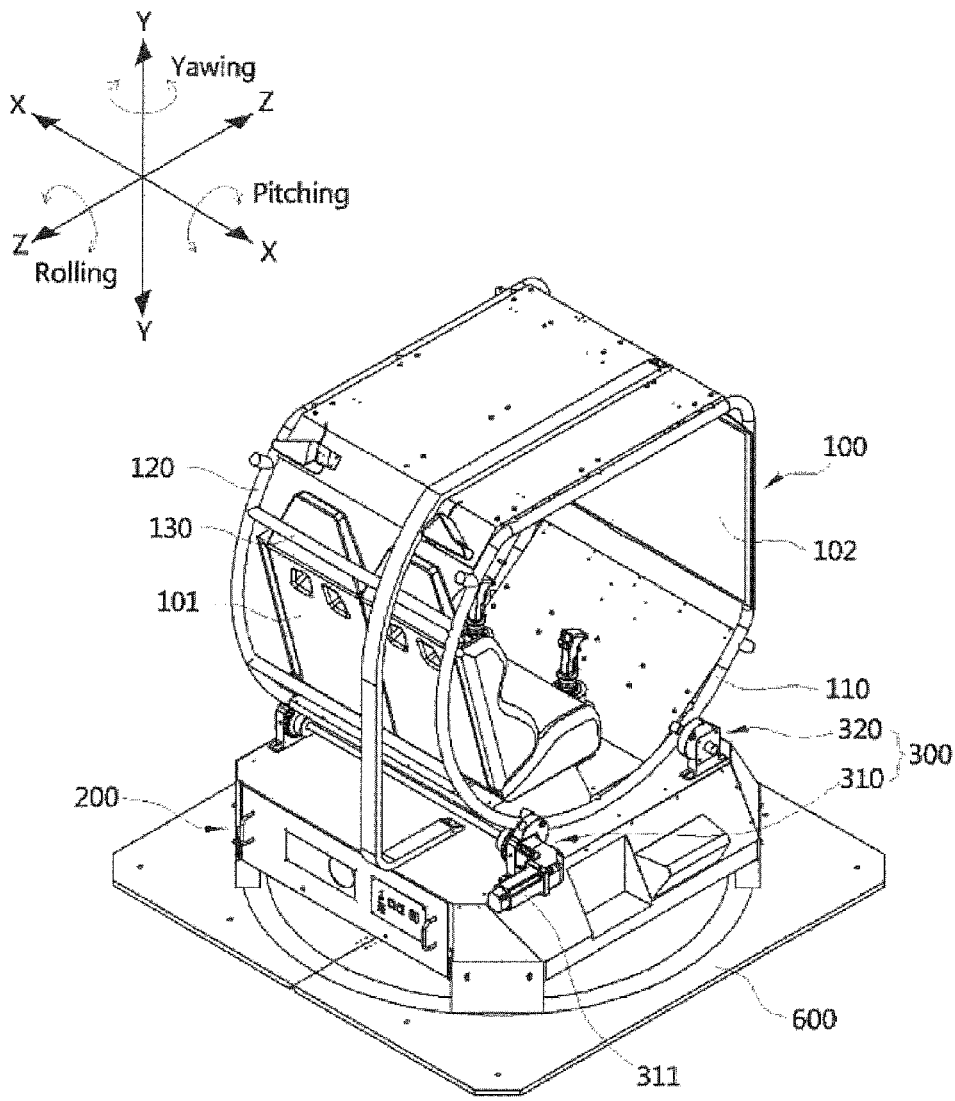
FIG. 1 is a perspective view of a motion simulator according to the present invention.

First, when describing movement, a rotation direction, and a degree of freedom with reference to FIG. 1, the movement of an object in a space includes six types of motions, such as a rectilinear motion in forward and backward directions (front↔back; Z-axis), a rectilinear motion in a horizontal direction (right↔left; X-axis), a rectilinear motion in a vertical direction (up↔down; Y-axis), rolling centering on the Z-axis, pitching centering on the X-axis, and yawing centering on the Y-axis, which are referred to as six degrees of freedom.

Hereinafter, an axis that connects the horizontal direction is referred to as the X-axis, an axis that connects the vertical direction is referred to as the Y-axis, and an axis that connects the forward and backward directions is referred to as the Z-axis, as defined in FIG. 1, and when describing a movement and a rotation direction based on these axes, a position in which a monitor 102 is located on the Z-axis, is referred to as the front, and a position in which a chair 101 is located on the Z-axis, is referred to as the rear.

Figure 2:
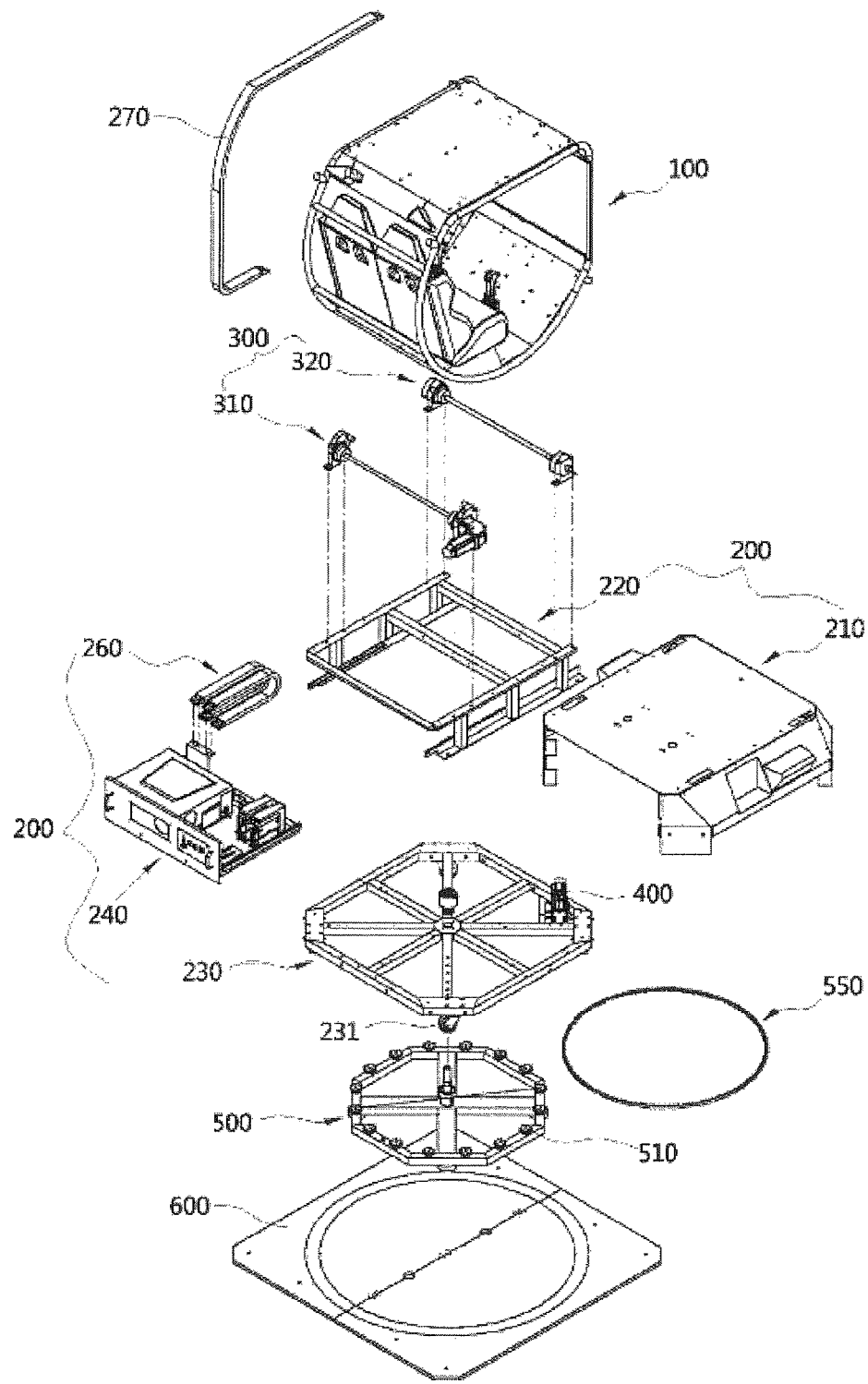
FIG. 2 is an exploded perspective view of the motion simulator illustrated in FIG. 1.

Referring to FIGS. 1 and 2, a motion simulator according to the present invention includes a first rotation body 100 that a user boards, a second rotation body 200 located under the first rotation body 100, a first driving unit 300 for pitching the first rotation body 100, a second driving unit 400 for yawing the first rotation body 100 and the second rotation body 200 as one body, and a controller (not shown) for controlling rotation of the first driving unit 300 and rotation of the second driving unit 400.

The first driving unit 300 includes a first motor 311 (FIG. 12), and when the first driving unit 300 drives the first motor 311, the first rotation body 100 is pitched centering on the X-axis.

The first rotation body 100 is supported so that a bottom end thereof is rotatable by the first driving unit 300. Thus, a rotational force of the first driving unit 300 is transferred to the first rotation body 100. The first driving unit 300 is fixed to an upper portion of the second rotation body 200.

The second driving unit 400 includes a motor, and when the motor of the second driving unit 400 is driven, the second rotation body 200 is yawed centering on the y-axis. In this case, the first driving unit 300 fixed to the upper portion of the second rotation body 200 and the first rotation body 100 supported at an upper portion of the first driving unit 300 are also yawed as one body together with the second rotation body 200.

A fixed frame 500 and a bottom plate 600 are provided on a lower portion of the second rotation body 200. The fixed frame 500 supports the lower portion of the second rotation body 200 so that the second rotation body 200 is rotatable, and driven portions 510 and 550 which are engaged with a rotation shaft of the motor of the second driving unit 400 are combined with the fixed frame 500.

The fixed frame 500 is fixed to a top surface of the bottom plate 600, and a plurality of casters 231 are provided on the second rotation body 200.

The second rotation body 200 includes a second rotation body cover 210, a second rotation body support frame 220, a second rotation body lower frame 230, a control module 240, and a first cable carrier 260. The second rotation body cover 210 is formed to cover the upper portion and side portions of the second rotation body 200. The second rotation body support frame 220 is provided in the second rotation body cover 210 and supports the second rotation body cover 210. The second rotation body lower frame 230 supports the lower portion of the second rotation body support frame 220, and the second driving unit 400 is mounted on one side of the second rotation body lower frame 230, and the plurality of casters 231 are mounted on a bottom surface of the second rotation body lower frame 230. Control components for controlling the first driving unit 300 and the second driving unit 400 are provided in the control module 240. Both side ends of the first cable carrier 260 are connected to the second rotation body lower frame 230 and the control module 240, respectively, and cables 2-1, 2-2, 3-1, and 3-2 (FIG. 16) that will be described below pass through an inside space of the first cable carrier 260.

Figure 3:
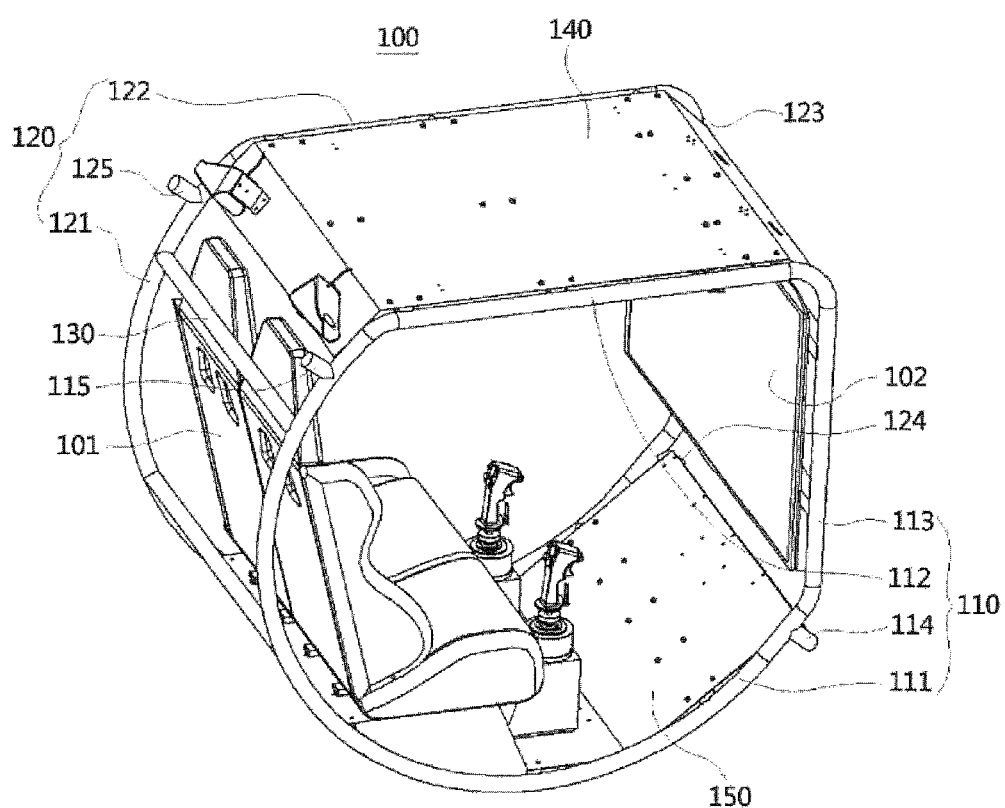
FIG. 3 is a perspective view of a first rotation body illustrated in FIG. 2.

The first rotation body 100 will be described with reference to FIG. 3.

The first rotation body 100 includes a chair 101 on which the user sits, a monitor 102 that provides a virtual environment formed by a manipulation of the user as an image, a first frame 110 and a second frame 120 provided to face each other on right and left sides of the first rotation body 100, a plurality of connection frames 130 that connect the first frame 110 and the second frame 120, a first rotation body upper cover 140 that covers an upper space between the first frame 110 and the second frame 120, and a first rotation body lower cover 150 that covers a lower space between the first frame 110 and the second frame 120.

The first frame 110 and the second frame 120 include rotation portions 111 and 121 that have curved shapes with uniform curvatures and rotate due to the first driving unit 300, horizontal connection portions 112 and 122 having lengths in the horizontal direction on upper ends of the rotation portions 111 and 121, and vertical connection portions 113 and 123 that connect ends of other sides of the horizontal connection portions 112 and 122 and ends of lower sides of the rotation portions 111 and 121.

Figure 12:
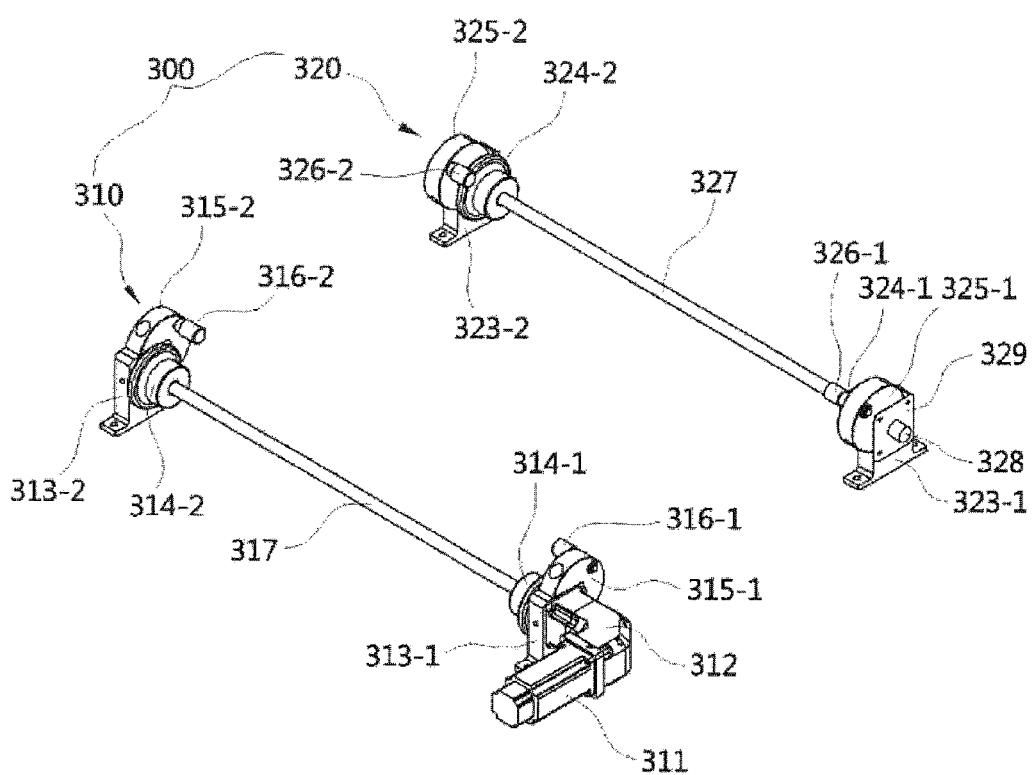
FIG. 12 is a perspective view of a first driving unit.

The rotation portions 111 and 121 are formed in arc shapes, and first stoppers 114 and 124 and second stoppers 115 and 125 for limiting the range of rotation when pitching rotation of the first rotation body 100 is performed by the first driving unit 300 are provided on both ends of the rotation portions 111 and 121. The first stoppers 114 and 124 and the second stoppers 115 and 125 protrude from the rotation portions 111 and 121 outward in a radial direction so that the first stoppers 114 and 124 and the second stoppers 115 and 125 catch on driving rollers 314-1 and 314-2 (FIG. 12) and driven rollers 324-1 and 324-2 (FIG. 12). Since the first stoppers 114 and 124 and the second stoppers 115 and 125 are provided, the first rotation body 100 does not leave a predetermined rotation range so that stability is improved.

A plurality of connection frames 130 may be provided at upper and lower portions of the first rotation body 100 and in front of and behind the first rotation body 100 so as to connect the first frame 110 and the second frame 120.

The chair 101 is provided on the first rotation body lower cover 150 so that the user boards the motion simulator. The first rotation body lower cover 150 is provided to cover a space between the first frame 110 and the second frame 120 in a predetermined range.

Figure 6:
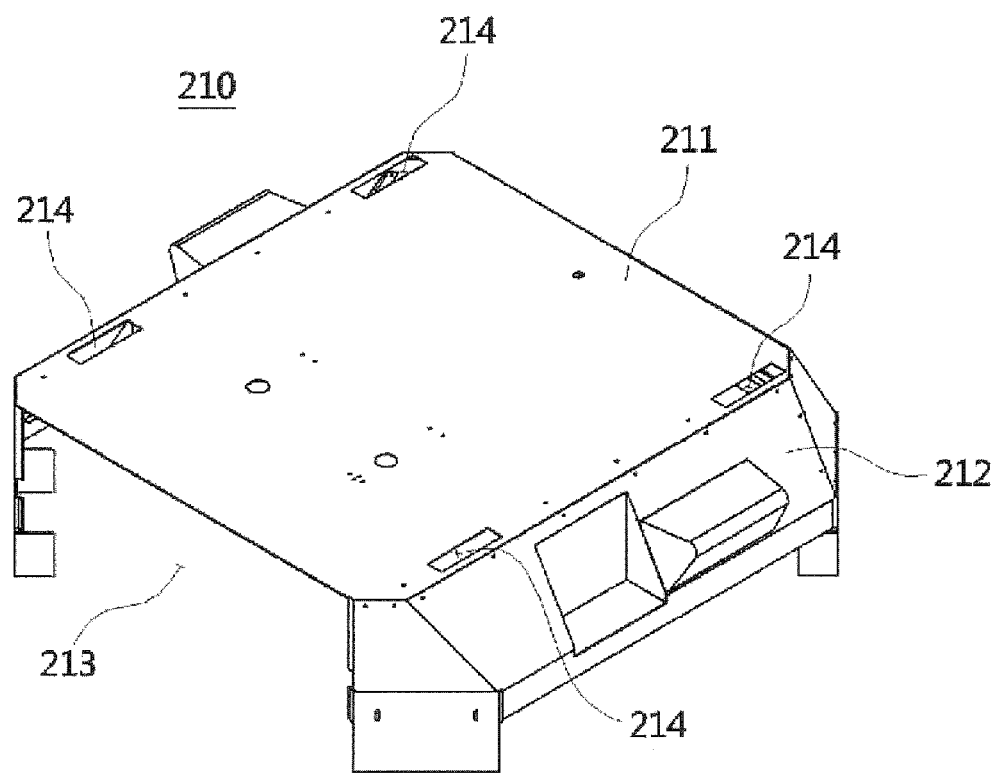
FIG. 6 is a perspective view of a second rotation body cover.

The second rotation body cover 210 will be described with reference to FIG. 6.

The second rotation body cover 210 includes an upper cover portion 211 having a shape of a flat plate to cover the upper portion of the second rotation body 200 and a side cover portion 212 that extends from edges of the upper cover portion 211 to be inclined in a downward direction. A cut opening 213 is formed in the rear of the side cover portion 212 so that the control module 240 is put into or drawn out of the second rotation body 200 through the opening 213. Cut portions 214 that are cut in rectangular shapes are formed at four edges of the upper cover portion 211. First bearing housings 313-1 and 313-2 (FIG. 12) and second bearing housings 323-1 and 323-2 (FIG. 12) that will be described below pass through the cut portions 214.

Figure 7:
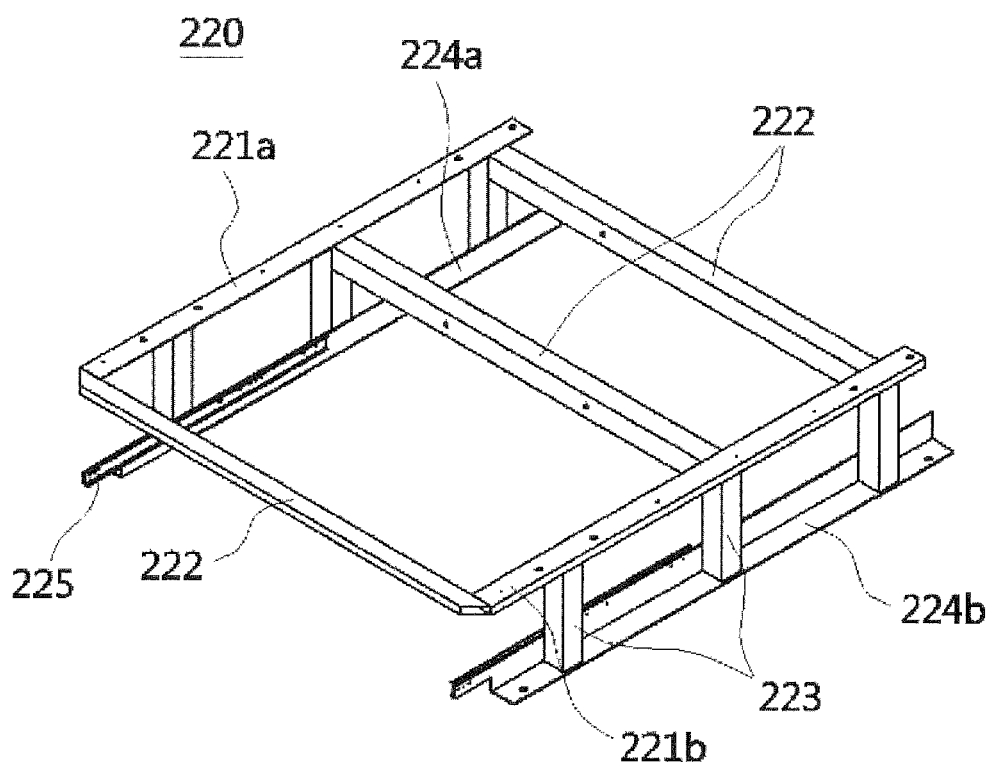
FIG. 7 is a perspective view of a second rotation body support frame.

The second rotation body support frame 220 will be described with reference to FIG. 7.

The second rotation body support frame 220 includes a pair of upper frames 221a and 221b that have lengths in forward and backward directions and are disposed to be spaced apart from each other in the horizontal direction and to face each other, a plurality of connection frames 222 that connect the upper frames 221a and 221b, a plurality of support frames 223 that support bottom surfaces of the upper frames 221a and 221b and have lengths in the vertical direction, and a pair of lower frames 224a and 224b that are combined with bottom ends of the support frames 223 and disposed on lower portions of the second rotation body support frame 220 corresponding to the upper frames 221a and 221b.

The lower frames 224a and 224b have L-shaped cross-sections, and slide rails 225 are combined with inner side surfaces of upright portions of the lower frames 224a and 224b so that a sliding motion of the control module 240 may be performed.

Figure 8:
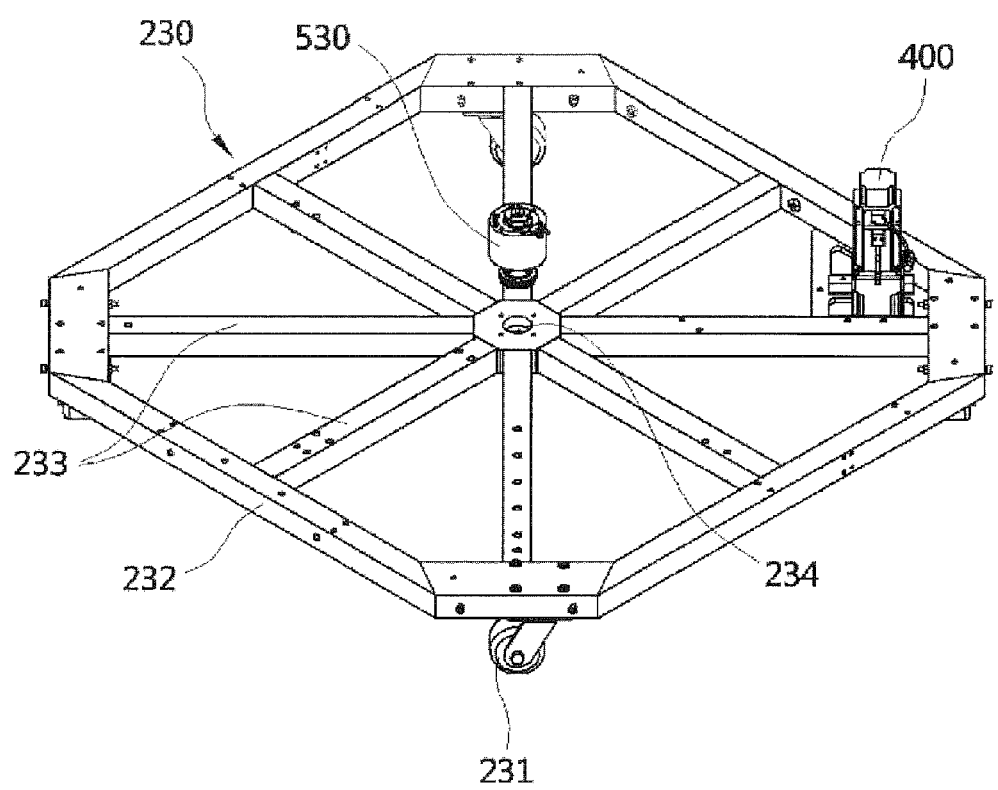
FIG. 8 is a perspective view of a second rotation body lower frame.
Figure 9:
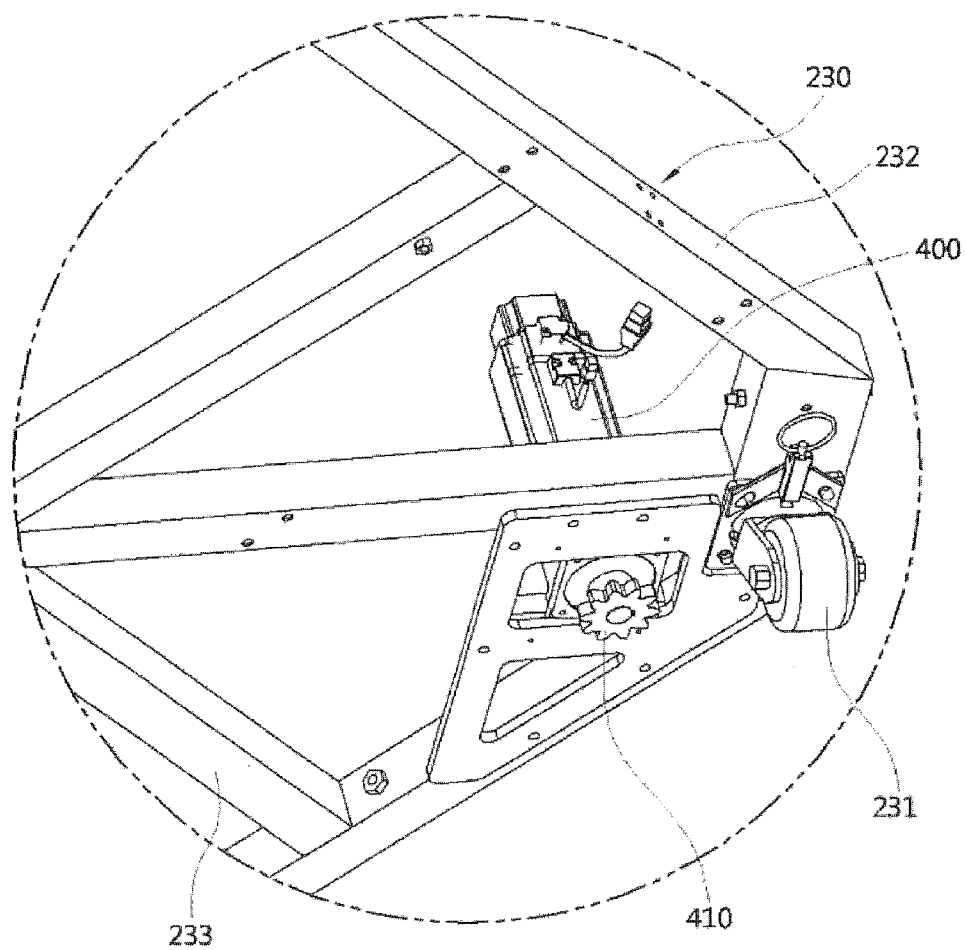
FIG. 9 is a perspective view of a part of the second rotation body lower frame in a downward direction.

The second rotation body lower frame 230 will be described with reference to FIGS. 8 and 9.

The second rotation body lower frame 230 is supported to be rotatable by the fixed frame 500 when the motion simulator operates, and the second rotation body lower frame 230 supports the entire structure of the motion simulator 1 when the motion simulator moves. The second rotation body lower frame 230 includes a first frame 232 that forms edges of the second rotation body lower frame 230 and a plurality of second frames 233 combined with the inner side surface of the first frame 232 at predetermined angular intervals.

A rotation support portion through hole 234 through which a rotation support portion (540 of FIG. 16) passes is formed in the center in which the plurality of second frames 233 meet each other.

The second driving unit 400 is combined with one side of the second rotation body lower frame 230 so as to provide a driving force for rotation of the second rotation body lower frame 230. The second driving unit 400 includes a second motor. The second motor is located so that a motor shaft of the second motor is disposed in a downward direction, and a first sprocket 410 is combined with the motor shaft of the second motor.

A plurality of casters 231 may be mounted on a bottom surface of the first frame 232 at predetermined angular intervals, and movement of the motion simulator 1 may be easily performed so that, when the motion simulator moves, a load of the motion simulator is applied to the casters 231.

When the second motor is driven, a rotational force of the second motor is transferred to the driven portions 510 and 550. The driven portions 510 and 550 include a plurality of second sprockets 510 combined with the fixed frame 500 and a chain 550 connected to the first sprocket 410 and the plurality of second sprockets 510. The first sprocket 410 and the second sprockets 510 are located at the same height. The first sprocket 410 combined with the shaft of the second motor is located eccentrically outward from a virtual connection line that connects outer circumferential surfaces of the plurality of second sprockets 510. Thus, an inner side surface of the chain 550 is connected to be engaged with an outer side surface of the first sprocket 410 and outer side surfaces of the plurality of second sprockets 510. When the second motor is driven in this connection state, the first sprocket 410, the second motor connected to the first sprocket 410, the second rotation body 200, the first rotation body 100, and the first driving unit 300 are rotated around the rotation support portion 540 along the inner side surface of the chain 550 with which the first sprocket 410 is engaged. The rotation support portion 540 may include a pair of bearings 540a and 540b. In this case, the plurality of second sprockets 510 rotate on their axes. This driving method has been described in Korean Patent Registration No. 10-1250429 and thus, an additional description thereof will be omitted.

Figure 10:
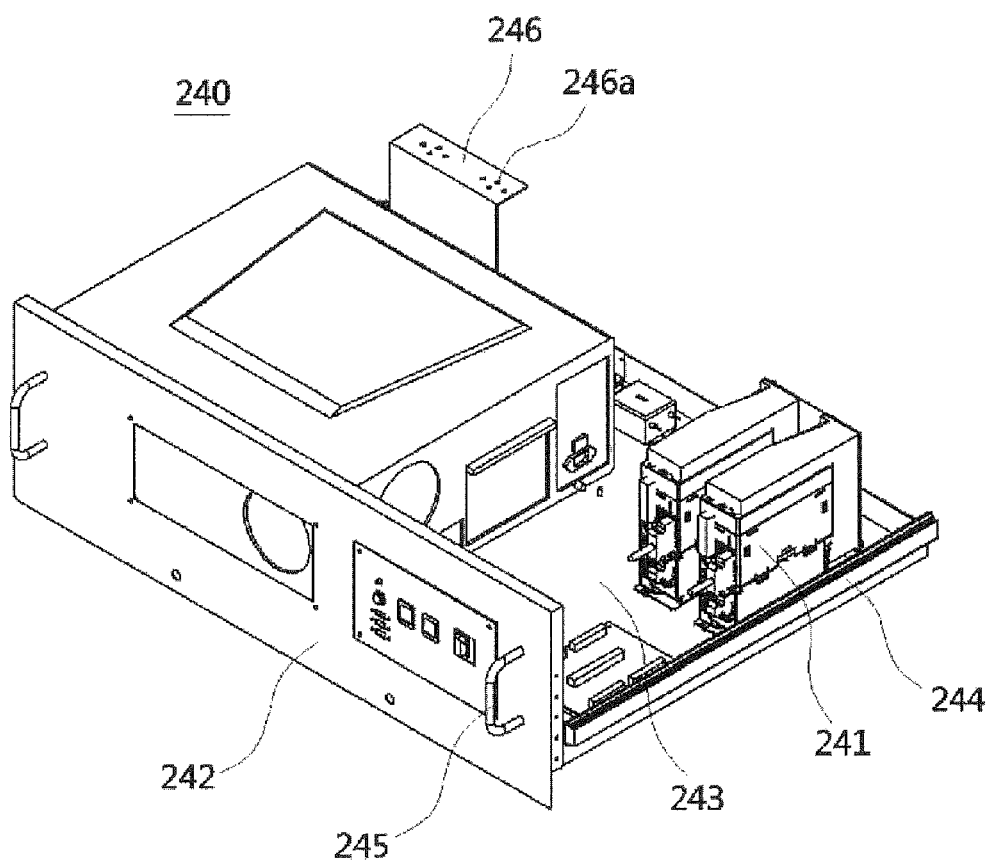
FIG. 10 is a perspective view of a control module.

The control module 240 will be described with reference to FIG. 10.

The control module 240 includes a plurality of control components 241 for controlling the first driving unit 300 and the second driving unit 400, a cover portion 242 that covers one side of the control module 240, a support plate 243 having a shape of a flat plate so that lower portions of the control components 241 are supported, a pair of rail guides 244 combined with the slide rails 255 to be slidable, a handle 245 through which the control module 240 is easily drawn toward an outside of the second rotation body 200, and a cable carrier combination portion 246 which is formed at an inner end of the support plate 243, and with which one end 263 of the first cable carrier 260 that will be described later is combined.

Figure 4:
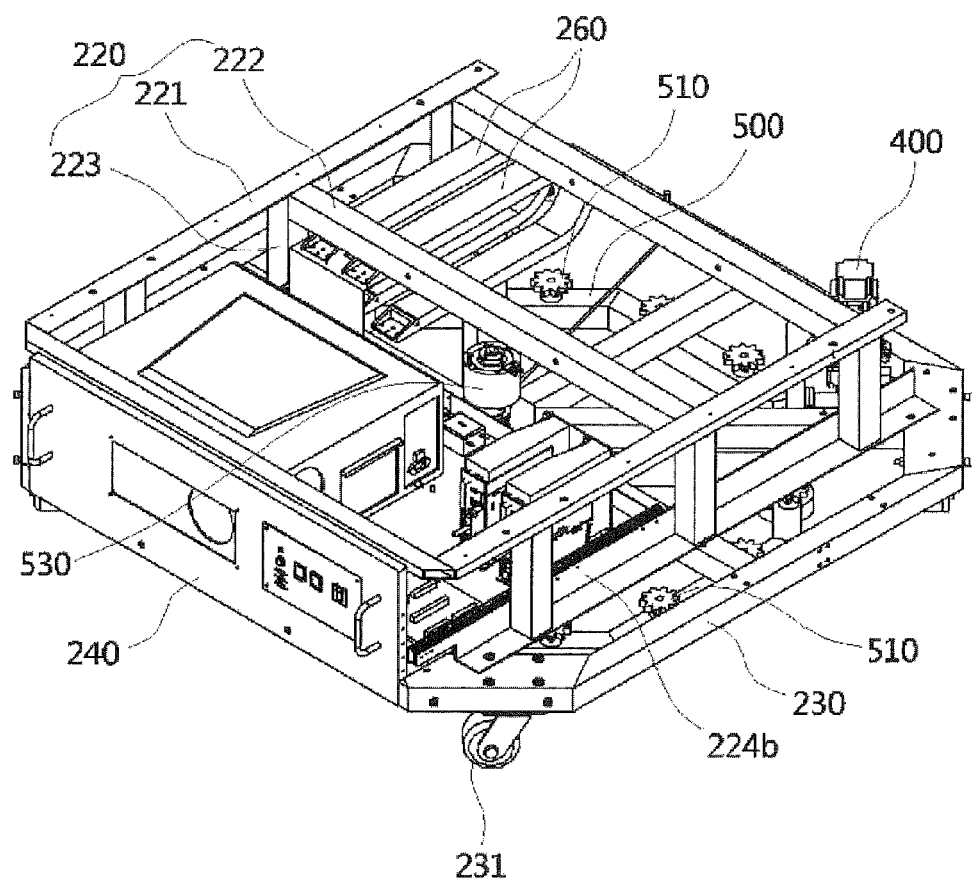
FIG. 4 is a perspective view showing a state in which a second rotation body, a second driving unit, and a fixed frame are combined with each other.
Figure 5:
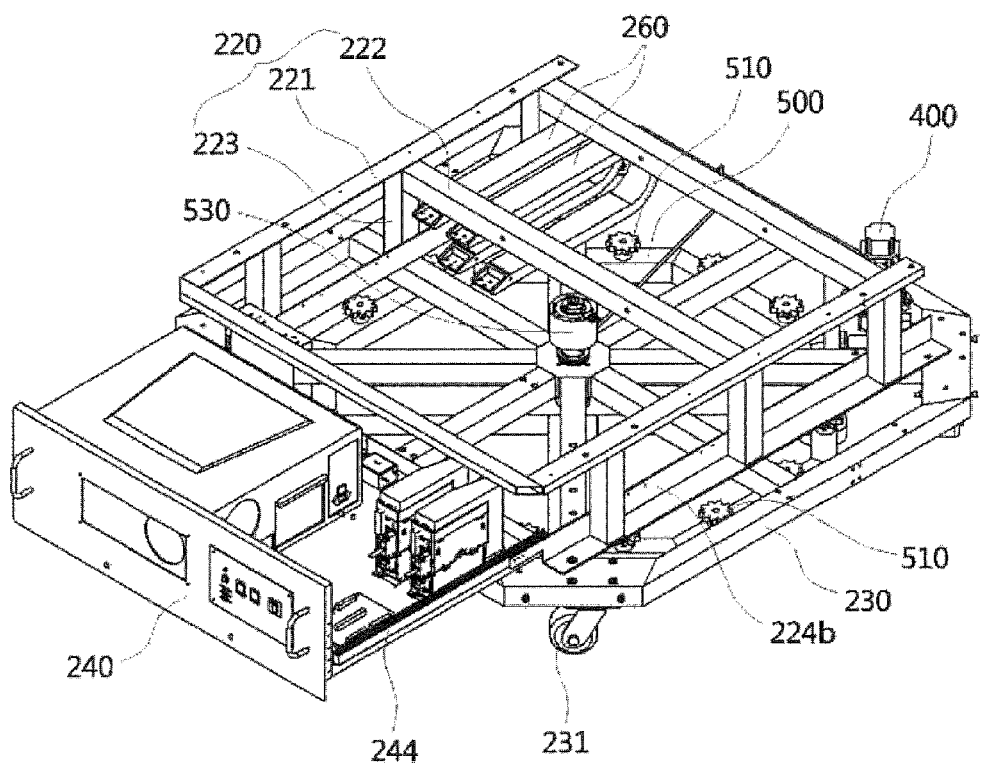
FIG. 5 is a view showing a state in which a control module makes a sliding motion in the state of FIG. 4.

As illustrated in FIG. 4, when the control module 240 is in the second rotation body 200, it is very inconvenient to do work for repairing the control components 241. Thus, when repair of the control components 241 is required and the handle 245 is pulled, the control module 240 is guided by the slide rails 225 and is drawn toward the outside of the second rotation body 200, like the state illustrated in FIG. 5.

Figure 11:
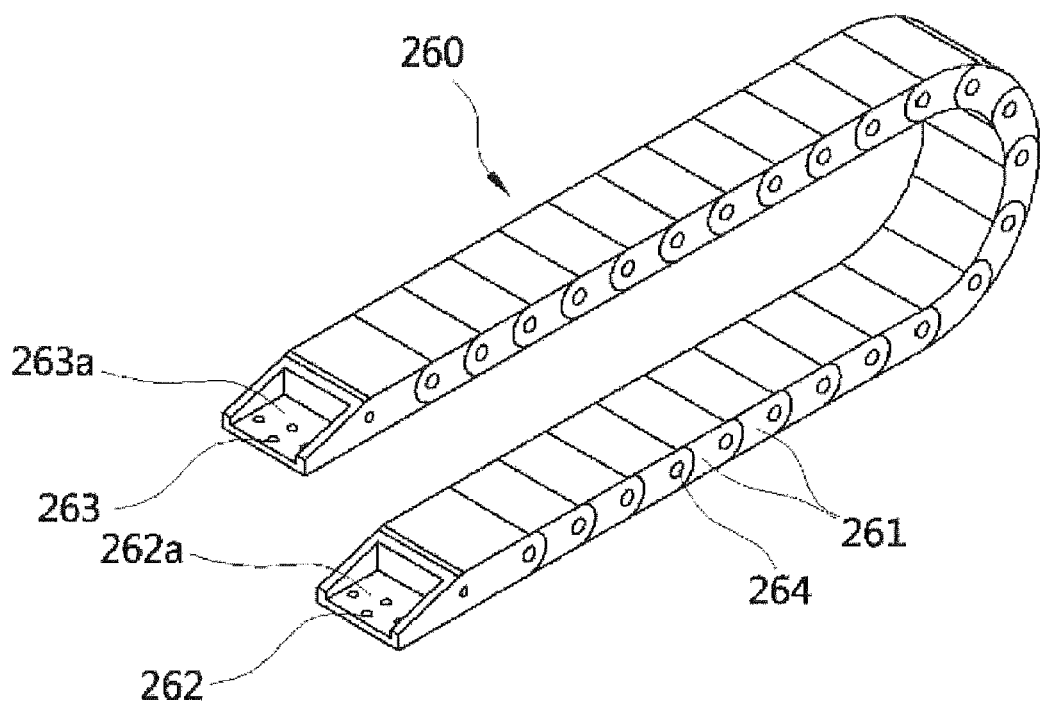
FIG. 11 is a perspective view showing an operating state of a first cable carrier.

The first cable carrier 260 will be described with reference to FIG. 11.

The first cable carrier 260 is configured so that the one end 263 of the first cable carrier 260 is combined with the cable carrier combination portion 246 of the control module 240 using a fastening member (not shown) and the other end 262 of the first cable carrier 260 is combined with the second rotation body support frame 220 using a fastening member (not shown).

A plurality of carrier pieces 261 are connected to the first cable carrier 260 using pins 264. Since adjacent carrier pieces 261 are hinge-coupled to the pins 264 and have flexible shapes, even though the first cable carrier 260 is bent, free modification is possible, as illustrated in FIG. 11.

The cables 2-1, 2-2, 3-1, and 3-2 for supplying power to the control components 241 of the control module 240 or transceiving control signals with the control components 241 of the control module 240 may include first cables 2-1 and 2-2 for supplying power and second cables 3-1 and 3-2 for transceiving control signals.

The first cables 2-1 and 2-2 and the second cables 3-1 and 3-2 pass through inner spaces of the plurality of carrier pieces 261 via the other end 262 of the first cable carrier 260, are drawn through the one end 263 of the first cable carrier 260 and then are connected to the control components 241.

Thus, when the control module 240 is drawn out of the second rotation body 200 outward in a state in which the other end 262 of the first cable carrier 260 is combined with the second rotation body support frame 220 and a position of the first cable carrier 260 is fixed, only the one end 263 of the first cable carrier 260 is drawn toward the outside of the second rotation body 200 together with the control module 240. In this case, the first cable carrier 260 may be modified in a flexible shape and thus may absorb a movement displacement of the control module 240.

Meanwhile, the second cable carrier 270 is configured so that one end of the second cable carrier 270 is combined with an upper portion of the control module 240, and the other end of the second cable carrier 270 is combined with an upper portion of the first rotation body 100. A cable (not shown) for supplying power and transceiving control signals is provided to pass through an inner space of the second cable carrier 270. One end of the cable is connected to the control components 241 inside the control module 240, and the other end of the cable is connected to the monitor 102 inside the first rotation body 100 and components, such as user manipulation tools. Since the second cable carrier 270 has the same shape as that of the first cable carrier 260, the second cable carrier 270 absorbs displacement when the first rotation body 100 rotates.

Figure 13:
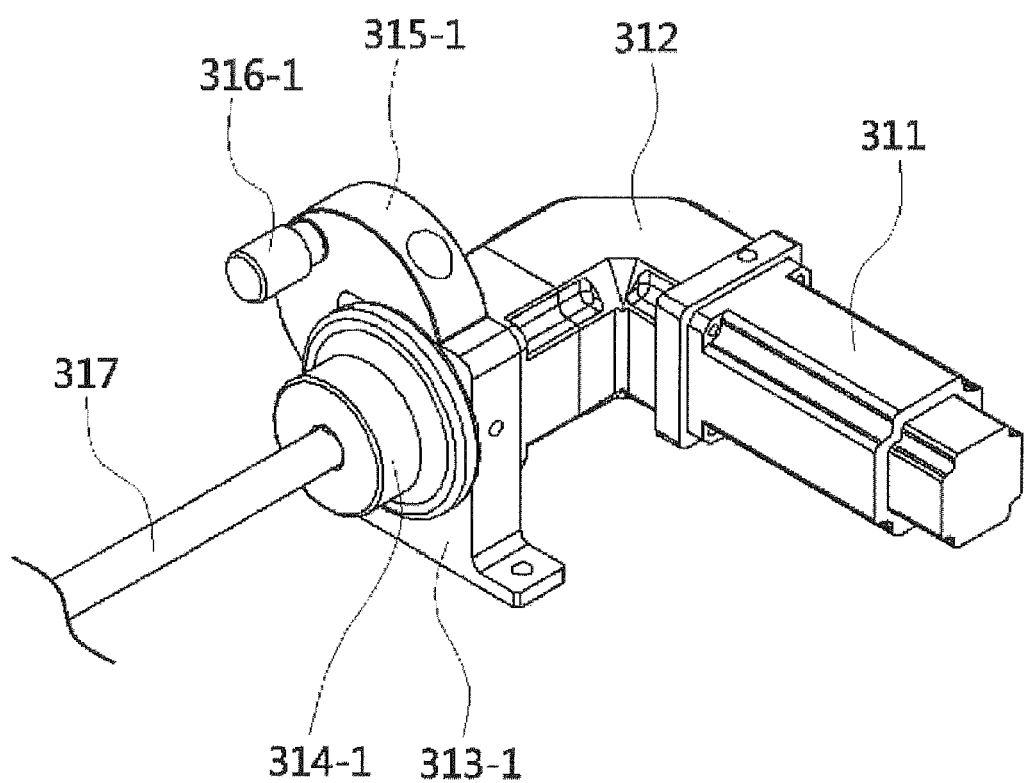
FIG. 13 is a perspective view of a driving module of the first driving unit.
Figure 14:
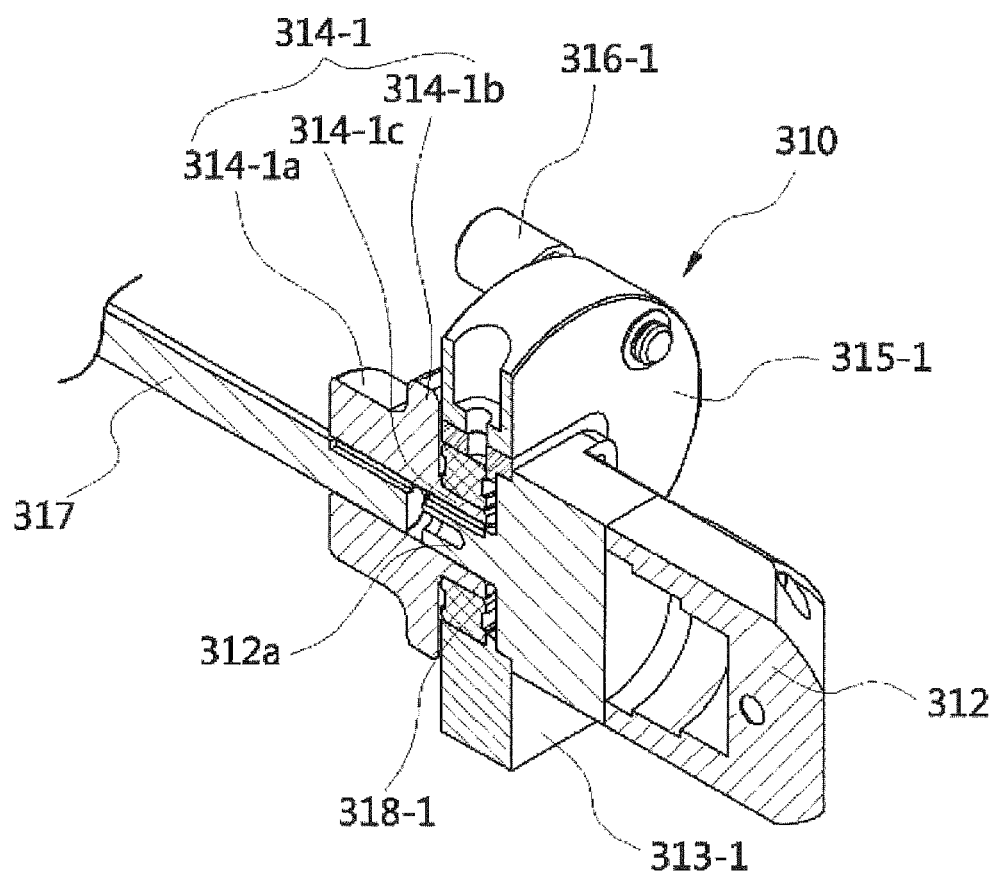
FIG. 14 is a cross-sectional view showing an internal structure of the driving module.

The first driving unit 300 will be described with reference to FIGS. 12 to 14.

The first driving unit 300 includes a driving module 310 that provides a rotational driving force to the first rotation body 100 and a driven module 320 that rotates together with the first rotation body 100 and is subordinate to the rotation of the first rotation body 100.

The driving module 310 includes a first motor 311, a decelerator 312, a pair of driving rollers 314-1 and 314-2, a driving shaft 317, first bearing housings 313-1 and 313-2, and first roller stoppers 316-1 and 316-2.

The first motor 311 provides a rotational driving force. The decelerator 312 reduces a rotational force of the first motor 311 and transfers the reduced rotational force to the driving rollers 314-1 and 314-2. The driving rollers 314-1 and 314-2 are rotated by the first motor 311 and rotate the first rotation body 100 due to a frictional force. The driving shaft 317 connects between the pair of driving rollers 314-1 and 314-2 and rotates as one body with the driving rollers 314-1 and 314-2. The first bearing housings 313-1 and 313-2 are fixed to the upper portion of the second rotation body 200 and support the driving rollers 314-1 and 314-2 to be rotatable through a medium of the first bearing 318-1. The first roller stoppers 316-1 and 316-2 are fixed to upper sides of the first bearing housings 313-1 and 313-2 and prevent the first rotation body 100 from escaping in an upward direction.

The driving roller 314-1 provided at one side of the driving shaft 317 includes a rotation body contact portion 314-1a having a cylindrical shape, a flange portion 314-1b that protrudes from an outer end of the rotation body contact portion 314-1a in a radial direction of the driving shaft 317, and a shaft coupling portion 314-1c that protrudes from an outer end of the rotation body contact portion 314-1a in a lengthwise direction of the driving shaft 317.

The driving shaft 317 passes centers of the rotation body contact portion 314-1a, the flange portion 314-1b, and the shaft coupling portion 314-1c sequentially. The driving shaft 317 is connected to a shaft 312a of the decelerator 312 in a state in which the driving roller 314-1 is located between the driving shaft 317 and the decelerator 312. That is, an inner circumferential surface of the rotation body contact portion 314-1a of the driving roller 314-1 is connected to an outer circumferential surface of the driving shaft 317 using a key so that a rotational force is transferred to the rotation body contact portion 314-1a, and an inner circumferential surface of the shaft coupling portion 314-1c is connected to an outer circumferential surface of the shaft 312a of the decelerator 312 using the key so that a rotational force is transferred to the shaft coupling portion 314-1c.

The first frame 110 may be formed by forming a metallic pipe, and the rotation body contact portion 314-1a that is a portion of the driving roller 314-1 contacting the rotation portion 111 may be formed of urethane. Thus, a rotational force is transmitted to the first frame 110 due to a frictional force between the rotation body contact portion 314-1a and the rotation portion 111

The first bearing 318-1 is inserted into the first bearing housing 313-1, and the shaft coupling portion 314-1c is inserted into the first bearing 318-1 and thus is smoothly rotated through the medium of the first bearing 318-1.

A bottom end of the first bearing housing 313-1 passes through the cut portions 214 of the second rotation body cover 210 and then is combined with the upper frames 221a and 221b of the second rotation body support frame 220 using a fastening member (not shown).

A first roller support member 315-1 is combined with an upper portion of the first bearing housing 313-1 using a fastening member (not shown). The first roller stopper 316-1 is combined with the first roller support member 315-1. The first roller stopper 316-1 protrudes from an inner side surface of the first roller support member 315-1 in the X-axis direction.

The rotation portion 111 of the first frame 110 is disposed between the first roller stopper 316-1 and the rotation body contact portion 314-1a of the driving roller 314-1. When the driving roller 314-1 is rotated in a state in which the rotation portion 111 is in contact with an outer circumferential surface of the rotation body contact portion 314-1a and is supported thereon, pitching rotation of the first rotation body 100 is performed due to a frictional force. In this case, the rotation portion 111 catches on the first roller stopper 316-1 and thus is prevented from escaping in an upward direction.

Because the driving roller 314-2, the first bearing housing 313-2, the first roller support member 315-2, the first roller stopper 316-2, and a first bearing (not shown), which are disposed on the other side of the driving shaft 317 have the same configuration as that of the driving roller 314-1, the first bearing housing 313-1, the first roller support member 315-1, the first roller stopper 316-1, and the first bearing 318-1 described above and have a symmetrical structure, a detailed description thereof will be omitted.

Rotation of the first rotation body 100 is performed in a state in which a rear end of the first rotation body 100 is supported on the driving module 310. On the other hand, no additional driving source is disposed in the driven module 320 so that the driven rollers 324-1 and 324-2 that contact and support the first rotation body 100 rotate according to the rotation (that is, are subordinate to the rotation) of the first rotation body 100 due to a frictional force.

The driven module 320 includes a pair of driven rollers 324-1 and 324-2, a driven shaft 327, the second bearing housings 323-1 and 323-2, second roller stoppers 326-1 and 326-2, and second roller support members 325-1 and 325-2. The driven rollers 324-1 and 324-2 rotate due to a frictional force with the rotation portions 111 and 121 of the first rotation body 100 and are subordinate to the rotation of the first rotation body 100. The driven shaft 327 connects between the pair of driven rollers 324-1 and 324-2 and rotates as one body with the driven rollers 324-1 and 324-2. The second bearing housings 323-1 and 323-2 are fixed to the upper portion of the second rotation body 200 and support the driven rollers 324-1 and 324-2 to be rotatable through a medium of a second bearing. The second roller stoppers 326-1 and 326-2 are fixed to upper sides of the second bearing housings 323-1 and 323-2 and prevent an upward escape of the first rotation body 100. The second roller stoppers 325-1 and 325-2 are combined with the second roller support members 325-1 and 325-2.

Because the driven rollers 324-1 and 324-2, the second bearing housings 323-1 and 323-2, the second roller support members 325-1 and 325-2, and the second roller stoppers 326-1 and 326-2 have the same configuration as that of the driving rollers 314-1 and 314-2, the first bearing housings 313-1 and 313-2, the first roller support members 325-1 and 325-2, and the first roller stoppers 316-1 and 316-2, which have been described in relation to the driving module 310, a detailed description thereof will be omitted.

An encoder 328 for measuring the number of revolutions of the driven roller 324-1 is disposed at a side portion of the first bearing housing 313-1. A frictional force is generated between the driving roller 314-1 and the rotation portion 111 so that rotation of the first rotation body 100 is performed. When a slip occurs between the rotation body contact portion 314-1a of the driving roller 314-1 and the rotation portion 111, the first rotation body 100 rotates with a smaller number of revolutions than the number of revolutions set by a manipulation of the user.

That is, signals for rotating the driving roller 314-1 a set number of revolutions (hereinafter, referred to as a 'set number of revolutions') are input to the controller using manipulation signals of the user. When the signals are input to the controller, the first motor 311 is driven by rotation to correspond to the set number of revolutions. For example, even though the first motor 311 is driven so that the driving roller 314-1 rotates by the number of revolutions of 1, when a slip occurs, the driving roller 314-1 rotates only by the number of revolutions of 0.5 that is smaller than 1. Rotation of the driving roller 314-1 by the number of revolutions of 0.5 means that the rotation portion 111 that contacts the driving roller 314-1 rotates by the number of revolutions corresponding to the number of revolutions of 0.5, and the driven roller 324-1 that contacts the rotation portion 111 rotates by the number of revolutions of 0.5. Thus, when the encoder 328 measures the number of revolutions of the driven roller 324-1, the controller compares the number of revolutions of the driven roller 324-1 measured in this way (hereinafter, referred to as a 'measured number of revolutions') with the set number of revolutions, and when there is a difference between the set number of revolutions and the measured number of revolutions, the controller controls rotation of the driving roller 314-1 and rotation of the driven roller 324-1 to increase the number of revolutions of the first motor 311 so as to compensate for the difference.

As described above, the number of revolutions of the driven roller 324-1 is measured using the encoder 328 so as to compensate for a slip of the driving roller 314-1. However, a slip may also be compensated for using an angle sensor (not shown) for measuring a rotation angle of the first rotation body 100. That is, the angle sensor is disposed at the first rotation body 100 and rotates as one body together with the first rotation body 100. In this case, the angle sensor can measure an angle at which the first rotation body 100 is rotated in a direction of gravity (hereinafter, referred to as a 'measured rotation angle'). When the first motor 311 is driven so as to rotate the first rotation body 100 to a desired angle, a rotation angle of the first rotation body 100 corresponding to the quantity of rotation of the driving roller 314-1 by rotation of the first motor 311 (hereinafter, referred to as a 'set rotation angle') is defined. When the controller compares the set rotation angle with the measured rotation angle and there is a difference between the set rotation angle and the measured rotation angle, the controller controls rotation of the first rotation body 100 and rotation of the driving roller 314-1 to increase the number of revolutions of the first motor 311 so as to compensate for the difference.

As described above, the first driving unit 300 is disposed at a lower portion of the first rotation body 100, and there is no obstacle in a lateral direction of the first frame 110 that constitutes the first rotation body 100 so that boarding of the user can be easily performed. Also, the first driving unit 300 allows the first rotation body 100 to be rotated with a frictional force so that a method of driving the first rotation body 100 can be simplified.

Figure 15:
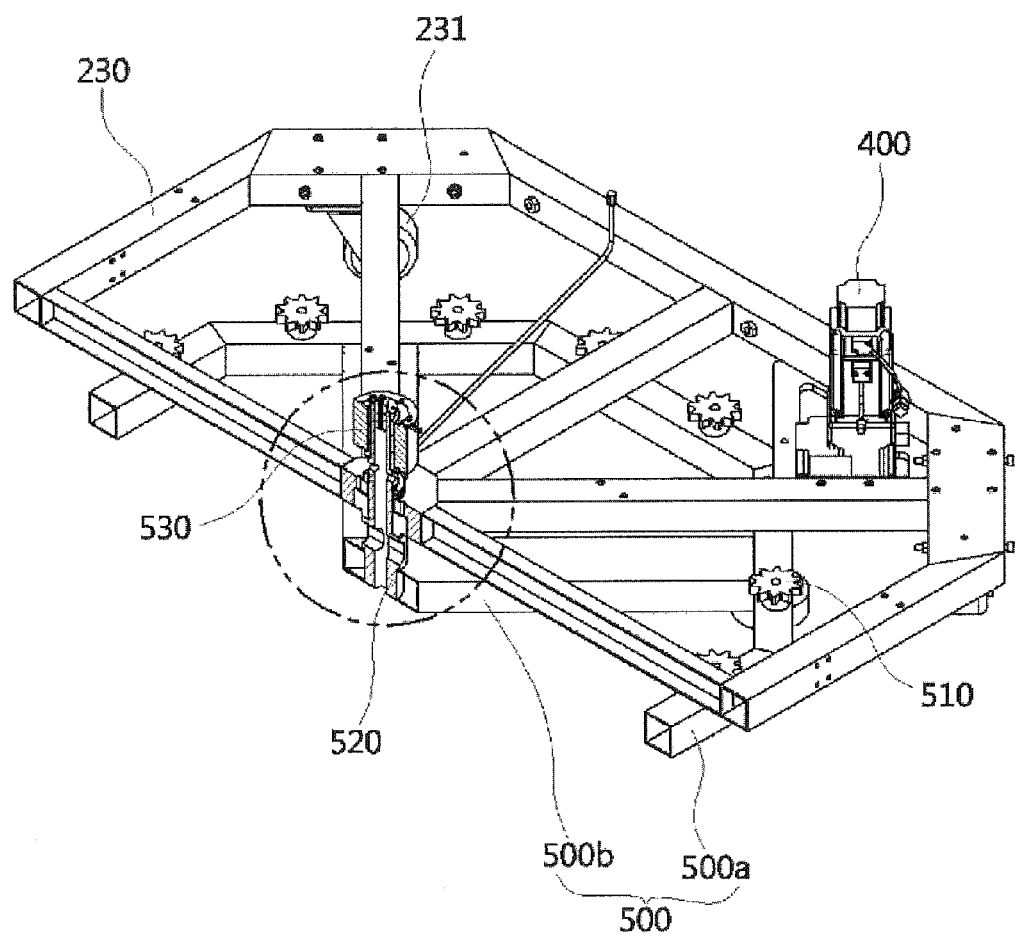
FIG. 15 is a cut perspective view showing a structure in which a slip ring and a slip ring connection member are connected to the second rotation body lower frame and the fixed frame.
Figure 16:
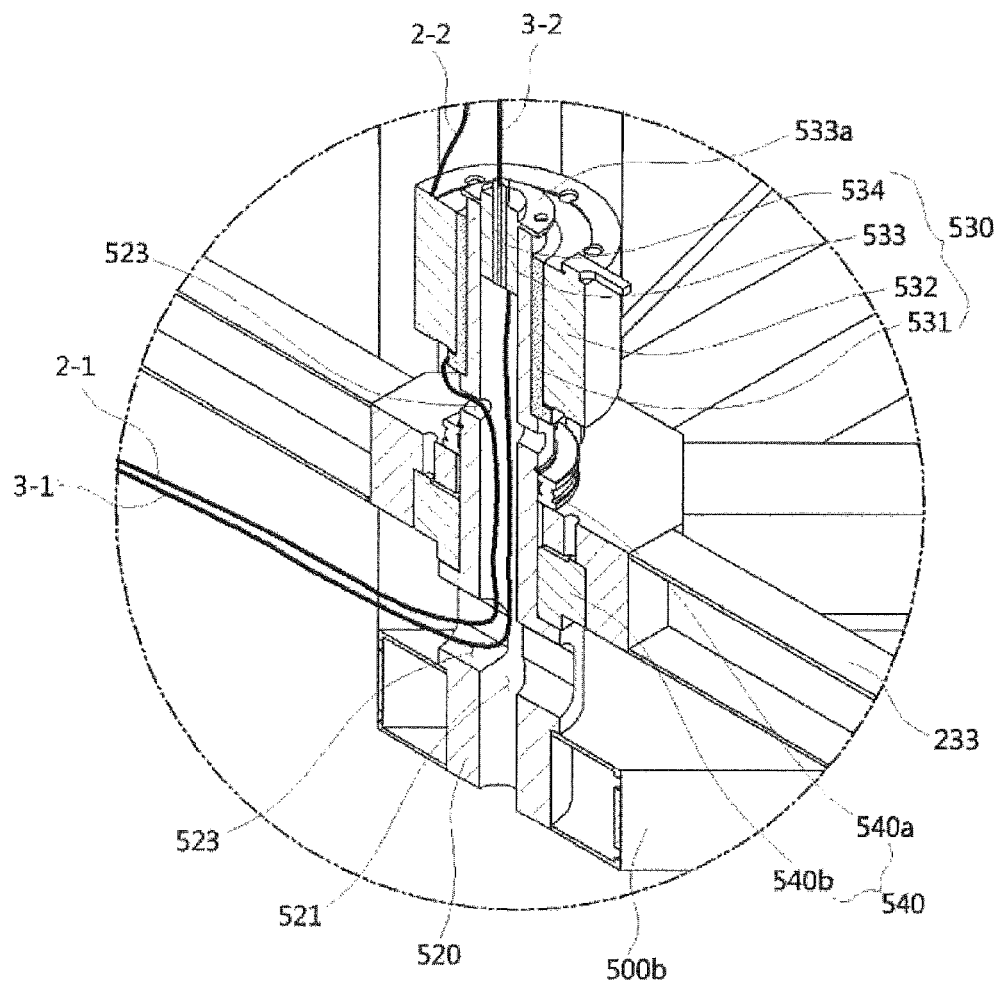
FIG. 16 is an enlarged cut perspective view of the slip ring and the slip ring connection member in FIG. 15.

A connection structure of the fixed frame 500 and a slip ring 530 will be described with reference to FIGS. 15 and 16.

The first cables 2-1 and 2-2 and the second cables 3-1 and 3-2 are used to supply power to the control module 240 and to transceive control signals. The first cables 2-1 and 2-2 and the second cables 3-1 and 3-2 are classified into a first external cable 2-1 and a second external cable 3-1, which are disposed outside the second rotation body 200, and a first internal cable 2-2 and a second internal cable 3-2, which are disposed in the second rotation body 200, based on the slip ring 530.

Since the second rotation body 200 having the control module 240 is yawed, if the first external cable 2-1 and the second external cable 3-1 that are drawn outside the second rotation body 200 extend and are connected to the control module 240, twisting of the cables occurs. Thus, the slip ring 530 is disposed so that the twisting of the cables can be prevented. The slip ring 530 is combined with a top end of a slip ring connection member 520.

The slip ring connection member 520 has a cylindrical shape with lengths in the vertical direction, and a bottom end of the slip ring connection member 520 is combined with a fixed frame 500b and thus is not rotated together with the second rotation body 200.

A central hole 521 is formed in the center of the slip ring connection member 520 in the vertical direction, and a first hole 522 and a second hole 523 are formed in the lateral direction so as to communicate with the central hole 521. The second hole 523 is formed in a higher position than the first hole 522.

The slip ring 530 includes a first slip ring inner race 531, a first slip ring outer race 532, a second slip ring outer race 533, and a second slip ring inner race 534.

The first slip ring inner race 531 having a cylindrical shape surrounds an outside of the slip ring connection member 520, is fixed to the slip ring connection member 520, and is not rotated and is maintained in a fixed state when the second rotation body 200 rotates. The first external cable 2-1 is connected to a bottom end of the first slip ring inner race 531.

The first slip ring outer race 532 having a cylindrical shape is disposed to surround an outside of the first slip ring inner race 531 and is rotated together when the second rotation body 200 rotates. The first internal cable 2-2 is connected to a top end of the first slip ring outer race 532.

The first slip ring outer race 532 and the first slip ring inner race 531 may be rotated relative to each other in a state in which no current flows between inner side surfaces and outer side surfaces of the first slip ring outer race 532 and the first slip ring inner race 531 that face each other.

The first slip ring outer race 532 may be rotated together with the second rotation body lower frame 230 by connecting the second rotation body lower frame 230 and the first slip ring outer race 532 using a connection member (not shown) so that the first slip ring outer race 532 is rotated together with the second rotation body 200. Alternatively, without using an additional connection member, the first slip ring outer race 532 may be pulled by the first internal cable 2-2 connected to the top end of the first slip ring outer race 532 and may be rotated when the second rotation body 200 rotates.

The second slip ring outer race 533 having a cylindrical shape is inserted into a top end of the central hole 521, and is not rotated and is maintained in a fixed state when the second rotation body 200 rotates. The second outer cable 3-1 is connected to a bottom end of the second slip ring outer race 533.

The second slip ring inner race 534 having a cylindrical shape is inserted into the center of the second slip ring outer race 533 and is rotated together when the second rotation body 200 rotates. The second internal cable 3-2 is connected to a top end of the second slip ring inner race 534.

The second slip ring outer race 533 and the second slip ring inner race 534 may be rotated relative to each other in a state in which no current flows between inner side surfaces and outer side surfaces of the second slip ring outer race 533 and the second slip ring inner race 534 that face each other.

The first external cable 2-1 and the second external cable 3-1 are inserted into the central hole 521 through the first hole 522, and are then inserted in the upward direction along the central hole 521. The first external cable 2-1 is drawn from the central hole 521 toward an outside of the slip ring connection member 520 through the second hole 523, and is then connected to the first slip ring inner race 531. The second external cable 3-1 is connected to the bottom end of the second slip ring outer race 533 from an inside of the central hole 521.

According to this configuration, the first cables 2-1 and 2-2 are electrically connected to each other in the order of the first external cable 2-1, the first slip ring inner race 531, the first slip ring outer race 532, and the first internal cable 2-2. Also, the second cables 3-1 and 3-2 are electrically connected to each other in the order of the second external cable 3-1, the second slip ring outer race 533, the second slip ring inner race 534, and the second internal cable 3-2. Thus, rotation of the second rotation body 200 can be performed in a state in which the first cables 2-1 and 2-2 and the second cables 3-1 and 3-2 are not twisted between the inside and the outside of the second rotation body 200.

Figure 17:
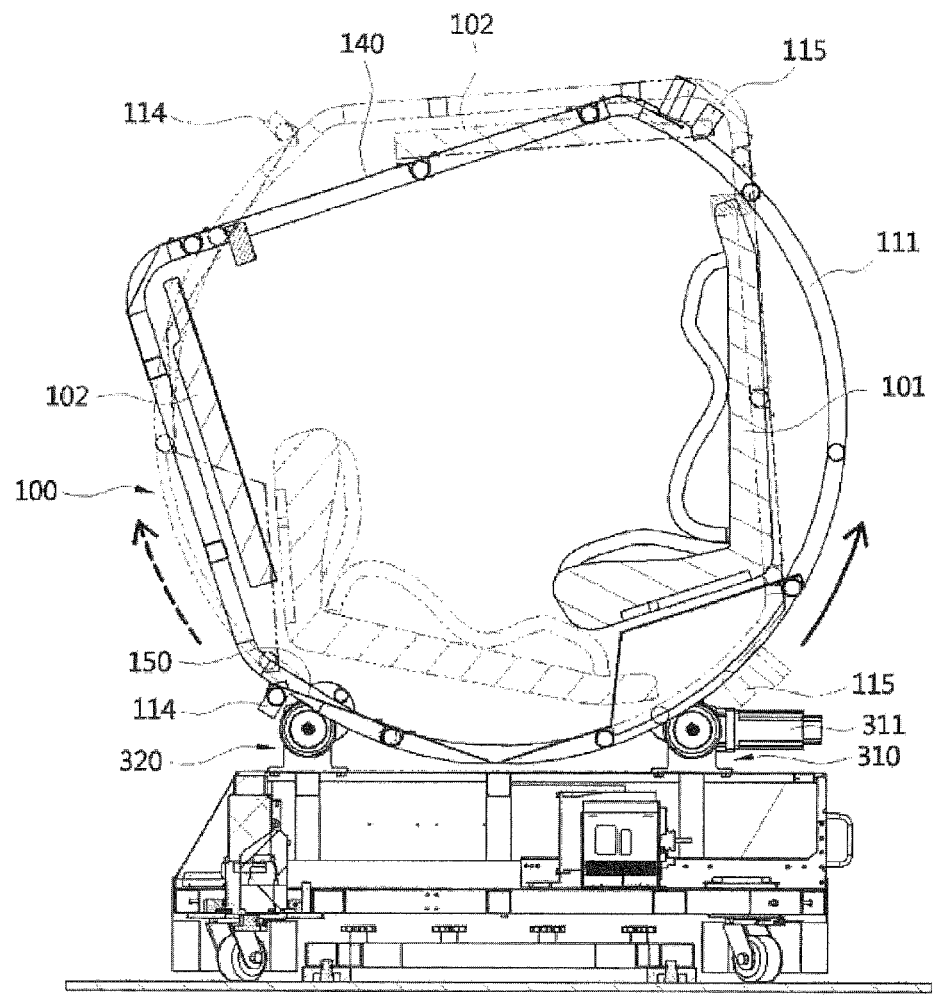
FIG. 17 is a view showing an operating state in which the first rotation body is rotated.

Referring to FIG. 17, when the first motor 311 is driven in a state in which the first rotation body 100 is supported on upper portions of the driving rollers 314-1 and 314-2, the first rotation body 100 is pitched due to a frictional force with the driving rollers 314-1 and 314-2. When the first rotation body 100 is pitched clockwise in a state of a portion indicated by thick solid lines of FIG. 17, rotation is performed, like in a portion indicated by chain thin double-dashed lines.

As described above, according to the present invention, two degrees of freedom of angular motion of pitching rotation of a first rotation body and yawing rotation of the first rotation body and a second rotation body can be implemented using a simple structure.

In addition, a driving unit for rotating the first rotation body is located on a lower portion of the first rotation body that a user boards, so that boarding of the user is easy.

In addition, the first rotation body is rotated with a frictional force so that a method of driving the first rotation body is simplified.

In addition, stoppers are provided so that the first rotation body does not leave a predetermined rotation range. Thus, stability can be improved.

In addition, a control module makes a sliding motion from the second rotation body so that repair of an inside of the control module can be easily performed.

In addition, a slip ring includes a first slip ring and a second slip ring having a concentric structure so that a power line and a signal line connected from an outside of a device can be connected to the control module without being twisted by using a simple structure.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A motion simulator comprising:
a first rotation body that a user boards;
a second rotation body located under the first rotation body;
a first driving unit for pitching the first rotation body;
a second driving unit for yawing the first rotation body and the second rotation body as one body; and
a controller for controlling rotation of the first driving unit and rotation of the second driving unit;
wherein the first driving unit is fixed to an upper portion of the second rotation body and supports a lower portion of the first rotation body so that a rotational force is transferred to the first rotation body,
wherein the rotational force is transferred due to a frictional force between the first rotation body and the first driving unit.

2. The motion simulator of claim 1, wherein the first driving unit comprises:
a driving module comprising a first motor for providing a rotational driving force, a pair of driving rollers that rotate by the first motor and rotate the first rotation body due to the frictional force, and a driving shaft that connects the pair of driving rollers and rotates as one body with the pair of driving rollers; and
a driven module comprising a pair of driven rollers that rotate due to the frictional force and are subordinate to the rotation of the first rotation body, and a driven shaft that connects the pair of driven rollers and rotates as one body with the pair of driven rollers.

3. The motion simulator of claim 2, wherein the first rotation body comprises a first frame and a second frame, which are disposed at positions corresponding to the pair of driving rollers, and a connection frame that connects between the first frame and the second frame, and the first frame and the second frame have curved shapes with uniform curvatures and respectively comprise rotation portions that rotate due to a frictional force between surfaces of the driving rollers and the driven rollers.

4. The motion simulator of claim 3, wherein the rotation portions are formed of metal, and portions of the driving rollers that contact the rotation portions are formed of urethane.

5. The motion simulator of claim 2, wherein an encoder for measuring the number of revolutions of the driven roller is provided, and the controller compares a set number of revolutions for rotating the driving roller by a set number of revolutions with a measured number of revolutions of the driven roller measured by the encoder and increases the number of revolutions of the first motor so as to compensate for a difference between the set number of revolutions and the measured number of revolutions.

6. The motion simulator of claim 2, wherein the driving module comprises first bearing housings that are fixed to the upper portion of the second rotation body and support the pair of driving rollers to be rotatable through a medium of a first bearing, and first roller stoppers that are fixed to upper sides of the first bearing housings and prevent the first rotation body from escaping in an upward direction, and the driven module comprises second bearing housings that are fixed to the upper portion of the second rotation body and support the pair of driven rollers to be rotatable through a medium of a second bearing, and second roller stoppers that are fixed to upper sides of the second bearing housings and prevent the first rotation body from escaping in the upward direction.

7. The motion simulator of claim 2, wherein an angle sensor for measuring a rotation angle is provided on the first rotation body, and the controller compares a set rotation angle for rotating the first rotation body to a set rotation angle with a measured rotation angle of the first rotation body measured by the angle sensor and increases the number of revolutions of the first motor so as to compensate for a difference between the set rotation angle and the measured rotation angle.

8. The motion simulator of claim 1, wherein the first rotation body comprises first stoppers and second stoppers for limiting a range of rotation when pitching rotation of the first rotation body is performed by the first driving unit.

9. The motion simulator of claim 1, wherein the second rotation body comprises:

a second rotation body cover formed to cover the upper portion and side portions of the second rotation body;

a second rotation body support frame that is provided in the second rotation body cover and supports the second rotation body cover;

a second rotation body lower frame that supports a lower portion of the second rotation body support frame, the second driving unit being mounted on one side of the second rotation body lower frame and a plurality of casters being mounted on a bottom surface of the second rotation body lower frame; and a control module in which control components for controlling the first driving unit and the second driving unit are provided, and a fixed frame is provided to support a lower portion of the second rotation body so that the second rotation body is rotatable and has a driven portion engaged with a rotation shaft of the second driving unit and mounted on the fixed frame.

10. The motion simulator of claim 9, wherein a pair of slide rails are provided on both sides of the second rotation body support frame, a pair of rail guides are provided on the control module to be combined with the pair of slide rails to be slidable, and the control module is slidable between an inside and an outside of the second rotation body.

11. The motion simulator of claim 10, wherein first cables and second cables are provided outside the second rotation body so as to supply power to the control module and to transceive signals, and a first cable carrier is provided so that one end of the first cable carrier is combined with the second rotation body lower frame, the other end of the first cable carrier is combined with the control module and the first cables and the second cables pass through an internal space of the first cable carrier, and the first cable carrier has a flexible shape to absorb movement displacement of the control module when the control module slides.

12. The motion simulator of claim 9, wherein a first external cable and a second external cable are provided outside the second rotation body and a first internal cable and a second internal cable are provided in the second rotation body so as to supply power to the control module from an outside of the second rotation body and to transceive signals, and a slip ring is provided to connect the first external cable and the first internal cable and the second external cable and the second internal cable, respectively, in a state in which the second rotation body rotates.

13. The motion simulator of claim 12, wherein a slip ring connection member is provided so that a bottom end of the slip ring connection member is fixed to the fixed frame, the slip ring connection member passes through the second rotation body lower frame in a vertical direction, a bearing is interposed between the slip ring connection member and the second rotation body lower frame, the slip ring is combined with a top end of the slip ring connection member and a central hole is formed in the slip ring connection member in the vertical direction, and the slip ring comprises:

a first slip ring inner race, which surrounds an outside of the slip ring connection member, to which the first external cable is connected, and which is fixed to the slip ring connection member so that rotation of the first slip ring inner race is prevented;

a first slip ring outer race, which is provided to surround an outside of the first slip ring inner race through which current flows between sides facing the first slip ring outer race and the first slip ring outer race, to which the first inner cable is connected, and which is rotated together with the second rotation body;

a second slip ring outer race, which is inserted into a top end of the central hole so that rotation of the second slip ring outer race is prevented, and to which the second external cable is connected; and a second slip ring inner race, which is inserted into the second slip ring outer race through which current flows between sides facing the second slip ring inner race and the second slip ring inner race, and to which the second inner cable is connected.

14. The motion simulator of claim 13, wherein a first hole and a second hole are formed in the slip ring connection member in a lateral direction so as to communicate with the central hole, and after the first external cable and the second external cable are inserted into the central hole through the first hole, the first external cable is drawn toward an outside of the slip ring connection member through the second hole and is connected to the first slip ring inner race, and the second external cable is connected to the second slip ring outer race in the central hole.

* * * * *